Sept. 24, 1935.  H. S. WHITE  2,015,130
VACUUM OPERATED MEANS FOR TREATING INSECT BITES AND THE LIKE
Filed April 13, 1934
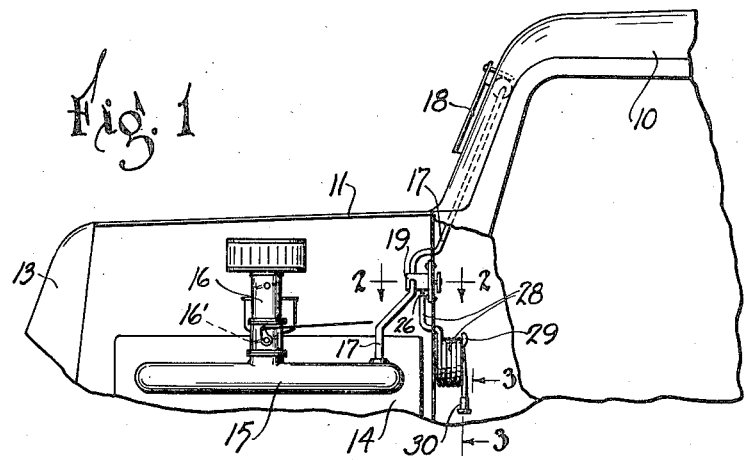
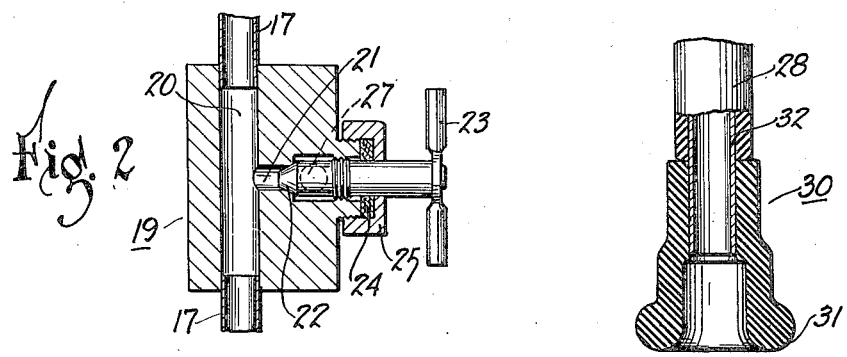
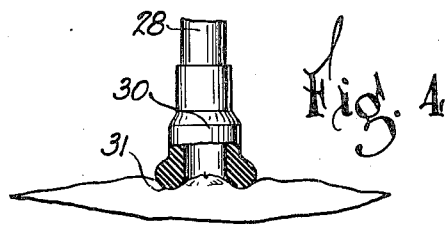
INVENTOR.
Harold S. White
BY
ATTORNEY.

Patented Sept. 24, 1935

2,015,130

UNITED STATES PATENT OFFICE 2,015,130

VACUUM-OPERATED MEANS FOR TREATING INSECT BITES AND THE LIKE

Harold S. White, South Bend, Ind.

Application April 13, 1934, Serial No. 720,443

1 Claim. (Cl. 128—297)

This invention relates to means for treating insect bites, snake bites, insect stings, and the like, and has for its principal object to provide vacuum-operated means for treating persons or animals so affected.

Another object is to provide means operatively connected with the intake manifold of a four-cycle internal combustion engine for treating such insect bites, snake bites or insect stings.

Another object is to provide a tube having a cup on the free end thereof operatively connected with the intake manifold of an internal combustion engine to thereby apply a sucking action on the affected part or parts of persons or animals infected by insect bites or stings, or to parts affected by the injection of poison thereto, as for example, snake bites.

A further object is to provide in a motor vehicle a tube operatively connected to the feed line of a vacuum-operated windshield wiper operative for treating, by a sucking action, the affected part or parts of persons or animals infected by insect bites or stings, snake bites, or from other kindred causes.

The above are some of the objects of my invention, and other objects, and objects relating to details of construction and methods of operation will be more apparent from the detailed description to follow.

In the drawing in which like numerals refer to like parts throughout the several views, Fig. 1 is a fragmentary side elevational view of a motor vehicle, certain parts being broken away to better show my invention incorporated therein.

Fig. 2 is an enlarged detailed sectional view, taken on the line 2—2 of Fig. 1, showing the valve operatively connecting the suction tube with the vacuum line leading from the intake manifold to the windshield wiper.

Fig. 3 is an enlarged detailed sectional view taken on the line 3—3 of Fig. 1, showing the cup at the free end of the tube.

Fig. 4 is a view similar to Fig. 3, showing the device as applied to an affected part of a person or animal.

The ill effects of insect bites or stings, as well as snake bites, to persons or animals is so well known to the medical profession and even laymen that a discussion or a description of such injuries is not necessary in disclosing applicant's invention. It has been found from numerous tests that almost immediate relief has been given to persons or animals bitten by mosquitoes or stung by insects by applying my device to the affected part of the body. Also, tests have been made on animals bitten by a rattle snake, and when the device as shown and described herein, was applied to the injured part immediately after the animal was bitten, the animal recovered and showed no ill effects from having been bitten. Further tests have developed that if my device is applied to such animals within thirty minutes after having been bitten by a rattle snake, they will recover although the recovery will not be so rapid as when the device is applied to the injured part immediately after the injury, as it is well understood that the time element is somewhat controlling in preventing the spread of poison to the body.

Although I have shown my device as connected with the intake manifold of an internal combuston engine as used in an automobile, it is to be understood that my invention is not to be limited to that use alone as my device may be operatively coupled with an internal combustion engine wherever used and wherever it is found necessary or desirable to provide means for treating persons or animals as heretofore explained.

To enable others to better understand my invention, reference will be had to the accompanying drawing in which I have diagrammatically illustrated a portion of an automobile having a body 10, a hood 11, a radiator 13, a four-cycle internal combustion engine 14 provided with an intake manifold 15, having a carburetor 16 equipped with a throttle valve 16' attached thereto. The intake manifold 15, at any suitable point therein, may be drilled to receive a suction pipe 17 which I have illustrated as leading to a vacuum-operated windshield wiper 18. In the vacuum line 17 leading from the intake manifold 15 to the windshield wiper 18, I provide a valve 19 having an opening 20 therethrough connecting the adjacent ends of the vacuum line 17, as shown in Fig. 2.

A port or opening 21 leading from the passage 20 is controlled by a needle valve 22 having an operating handle 23 at the exposed end thereof. Suitable packing 24 and a packing nut 25 may be provided to form a seal for the valve 22. A tube 26 connected with the passageway 27 which communicates with the passage 21 has attached thereto a flexible tube 28 preferably formed of rubber.

The valve 19 may be supported on the dash of the automobile or at any other suitable place where it is found convenient to provide the connection in a vacuum line connected with the engine intake manifold. As it is often desirable or preferable to make the tube 28 of suitable length, I provide a hook or carrier 29 over which it may be carried to prevent injury to the same when not in use. At the outer or free end of the tube 28, I provide a cup or contact member 30 which is preferably provided with a bead 31 at its outer end and which is suitably rounded to prevent injury or discomfort when the cup is applied to the injured part of the person or animal. The cup 30 may be attached to the tube 28 in any suitable manner and I have illustrated for that purpose a thin metal tube 32 inserted in the adjacent ends of these members and which may be cemented thereto if desired. Also, the cup 30 may be cemented or vulcanized to the end of the tube 28, omitting the thin metal tube 32.

When it is desired to treat mosquito bites, insect stings and the like, the end 31 of the cup 30 is applied over the injured part, as illustrated in Fig. 4 so that the vacuum created by the internal combustion engine will cause a sucking action on part of the body within the confines of the cup and thus draw out any poison in that affected part. In the case of mosquito bites, it has been found that the cup 30 may be rubbed gently over the injured part and that within a short period of time after the part is so treated, no traces will be left on the body part having been affected.

The time required for treating the injured part may be controlled to a considerable extent by regulating the vacuum in the intake manifold 15, so that it will be understood that by closing the throttle valve 16' the time required for treating the person or animal will be shortened due to the increased sucking effect that may be obtained. That is, with a closed throttle, the vacuum in the intake manifold is increased which will cause a greater sucking action on each suction stroke of the piston in the engine.

In treating insect stings, the cup 30 may be applied over the injured body part and held in that position a short time so that the suction in the tube will lift the stinger from the body and remove any poison caused by the stinger entering the body.

As internal combustion engines of the four-cycle type are capable of creating a vacuum on the intake side of the engine, with a closed throttle valve, sufficient to raise eighteen inches of mercury, sufficient suction is provided to effect all the advantages heretofore described.

While in the specification and claim, reference is made to insect bites, it is to be understood that the phrase "insect bites" is intended to include snake bites, insect stings, and infections, as for example, boils, which may be treated by my device.

While I have shown one form of suction device operatively connected with the intake manifold of an internal combustion engine, it will be apparent to others after having seen my invention that detailed changes, and changes in the construction and shape of the tube and cup, may be provided without departing from the spirit and scope of my invention and, therefore, my invention is to be limited only by the scope of the sub-joined claim.

What I claim is:

An insect bite treating device for attachment to the intake manifold of an internal combustion engine automobile which comprises, in combination, an elongated tube adapted for connection with said intake manifold at a point within the engine compartment of the automobile and extending into the passenger compartment of the automobile, a valve in said tube adjacent the point of said connection whereby the amount of suction communicated to the tube from the intake manifold may be regulated to a predetermined degree, control means for said valve operable from within the passenger compartment of the automobile, a support for said elongated tube to store the same when not in use, and a cup carried by the free end of said elongated tube, said cup being adapted to engage the insect bite area and supply suction thereto.

HAROLD S. WHITE.